US008294791B2

(12) United States Patent
Iwabuchi

(10) Patent No.: US 8,294,791 B2
(45) Date of Patent: Oct. 23, 2012

(54) IMAGE CORRECTION APPARATUS FOR DIGITAL DODGING

(75) Inventor: Kiyoshi Iwabuchi, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 12/501,181

(22) Filed: Jul. 10, 2009

(65) Prior Publication Data
US 2010/0007776 A1   Jan. 14, 2010

(30) Foreign Application Priority Data

Jul. 14, 2008  (JP) .................................. 2008-182962

(51) Int. Cl.
*H04N 5/217*  (2006.01)
*H04N 9/68*   (2006.01)
*H04N 5/208*  (2006.01)

(52) U.S. Cl. ......... 348/241; 348/234; 348/235; 348/252

(58) Field of Classification Search ................ None
See application file for complete search history.

(56) References Cited

U.S. PATENT DOCUMENTS

| 7,843,493 B2* | 11/2010 | Katagiri et al. ............ 348/222.1 |
| 2002/0006230 A1* | 1/2002 | Enomoto ...................... 382/261 |
| 2002/0012064 A1* | 1/2002 | Yamaguchi ................... 348/362 |
| 2005/0141046 A1* | 6/2005 | Kito et al. ...................... 358/471 |
| 2006/0045377 A1* | 3/2006 | Kawai ........................... 382/274 |
| 2007/0182830 A1* | 8/2007 | Katagiri et al. ............ 348/222.1 |
| 2008/0122953 A1* | 5/2008 | Wakahara et al. ............ 348/241 |
| 2008/0219585 A1* | 9/2008 | Kasai et al. .................... 382/274 |
| 2008/0252791 A1* | 10/2008 | Mitsunaga .................... 348/673 |
| 2010/0302405 A1* | 12/2010 | Katagiri et al. ............ 348/222.1 |
| 2011/0037870 A1* | 2/2011 | Katagiri et al. ............ 348/222.1 |

FOREIGN PATENT DOCUMENTS

| JP | 05-040825 A | 2/1993 |
| JP | 2004-220327 A | 8/2004 |
| JP | 2004-303076 A | 10/2004 |
| JP | 2005-135083 A | 5/2005 |
| JP | 2006-065676 A | 3/2006 |
| JP | 2008-048253 A | 2/2008 |

* cited by examiner

*Primary Examiner* — Lin Ye
*Assistant Examiner* — John H Morehead, III
(74) *Attorney, Agent, or Firm* — Canon U.S.A., Inc. IP Division

(57) ABSTRACT

An image correction apparatus reduces an input image, for each area, at a reduction ratio corresponding to the area, generates a reduced luminance image, and extracts a low-frequency component image from the reduced luminance image. The image correction apparatus enlarges the extracted low-frequency component image, for each area, at an enlargement ratio corresponding to the area, generates correction data according to a size of the input image, and corrects the input image according to the correction data.

19 Claims, 10 Drawing Sheets

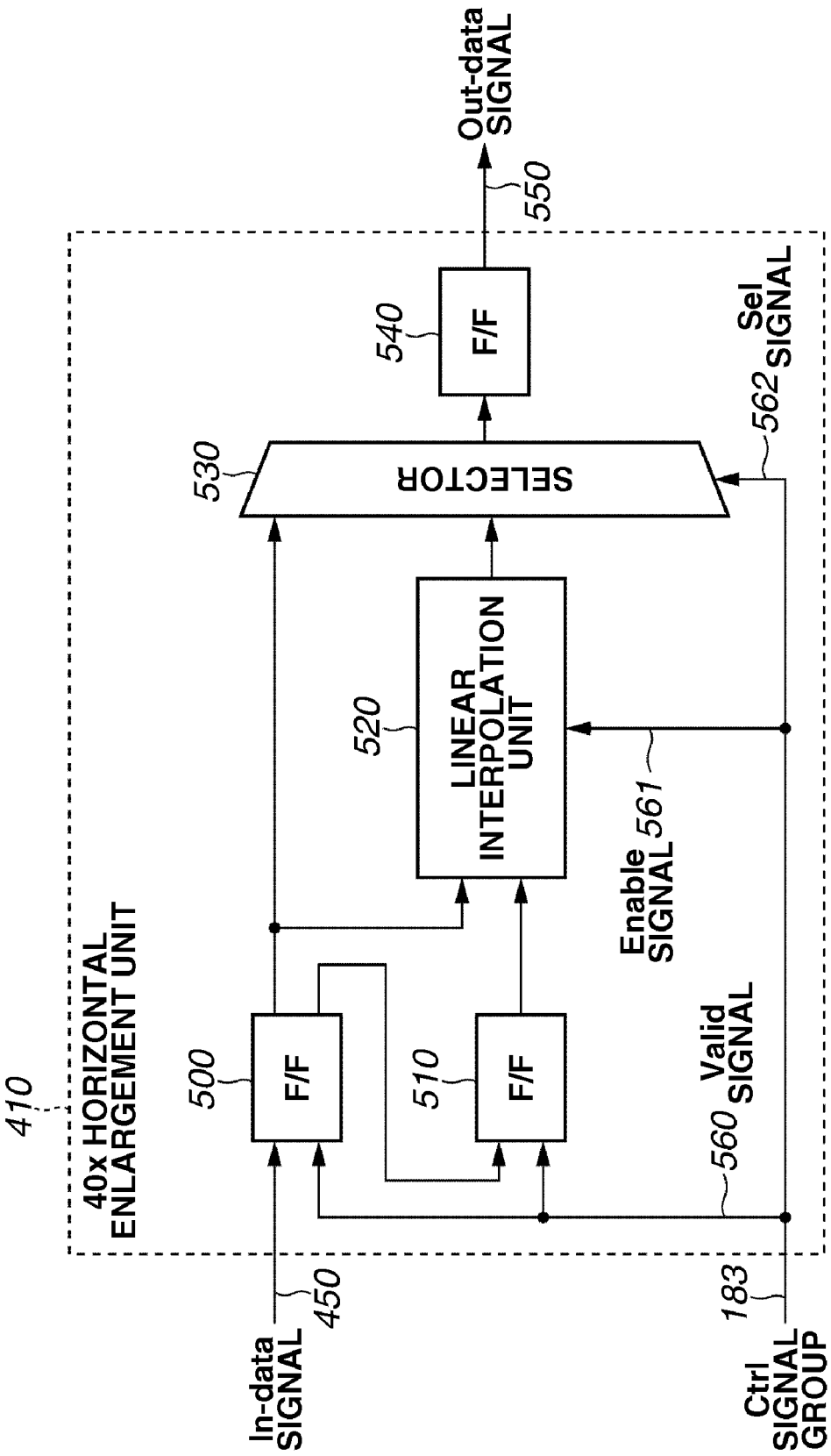

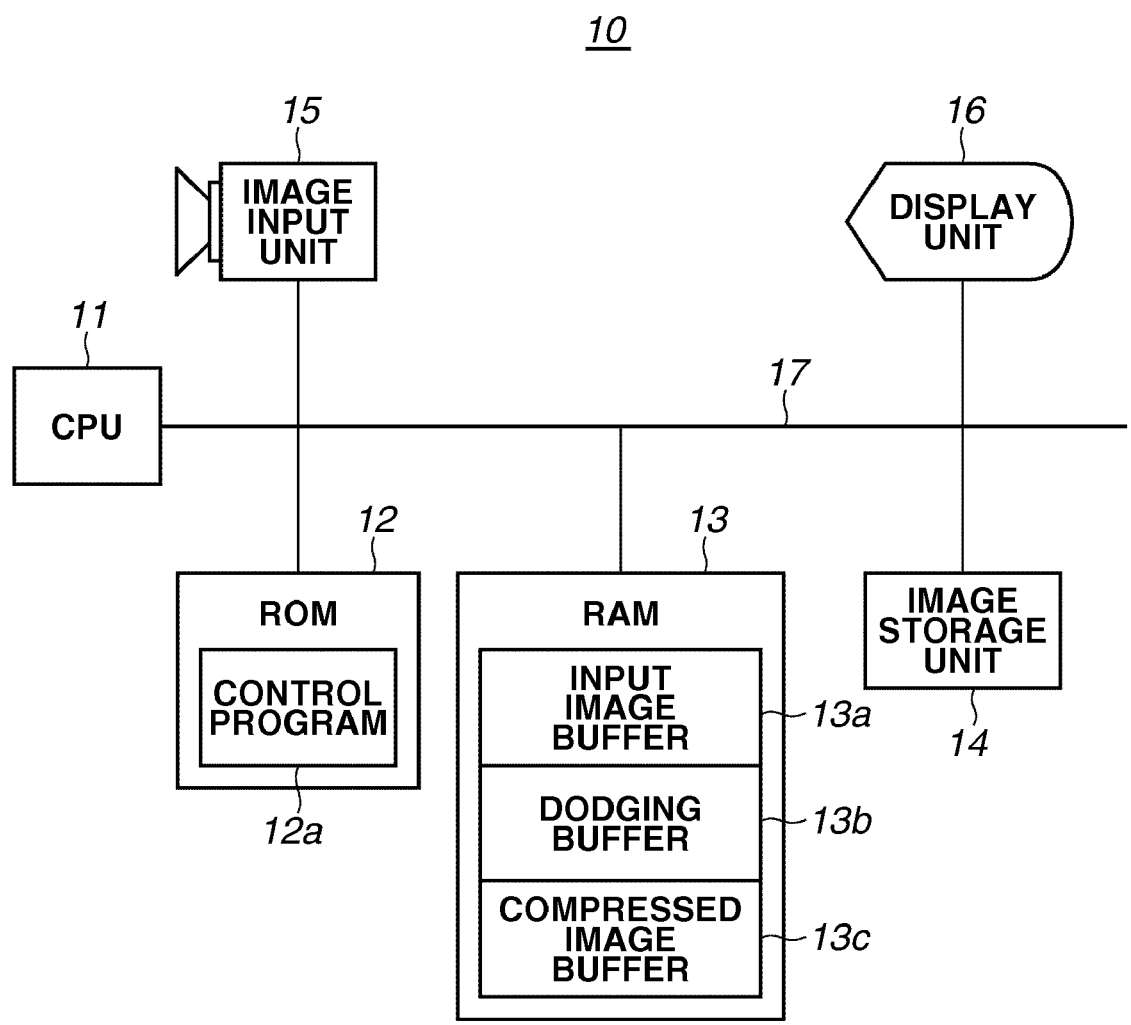

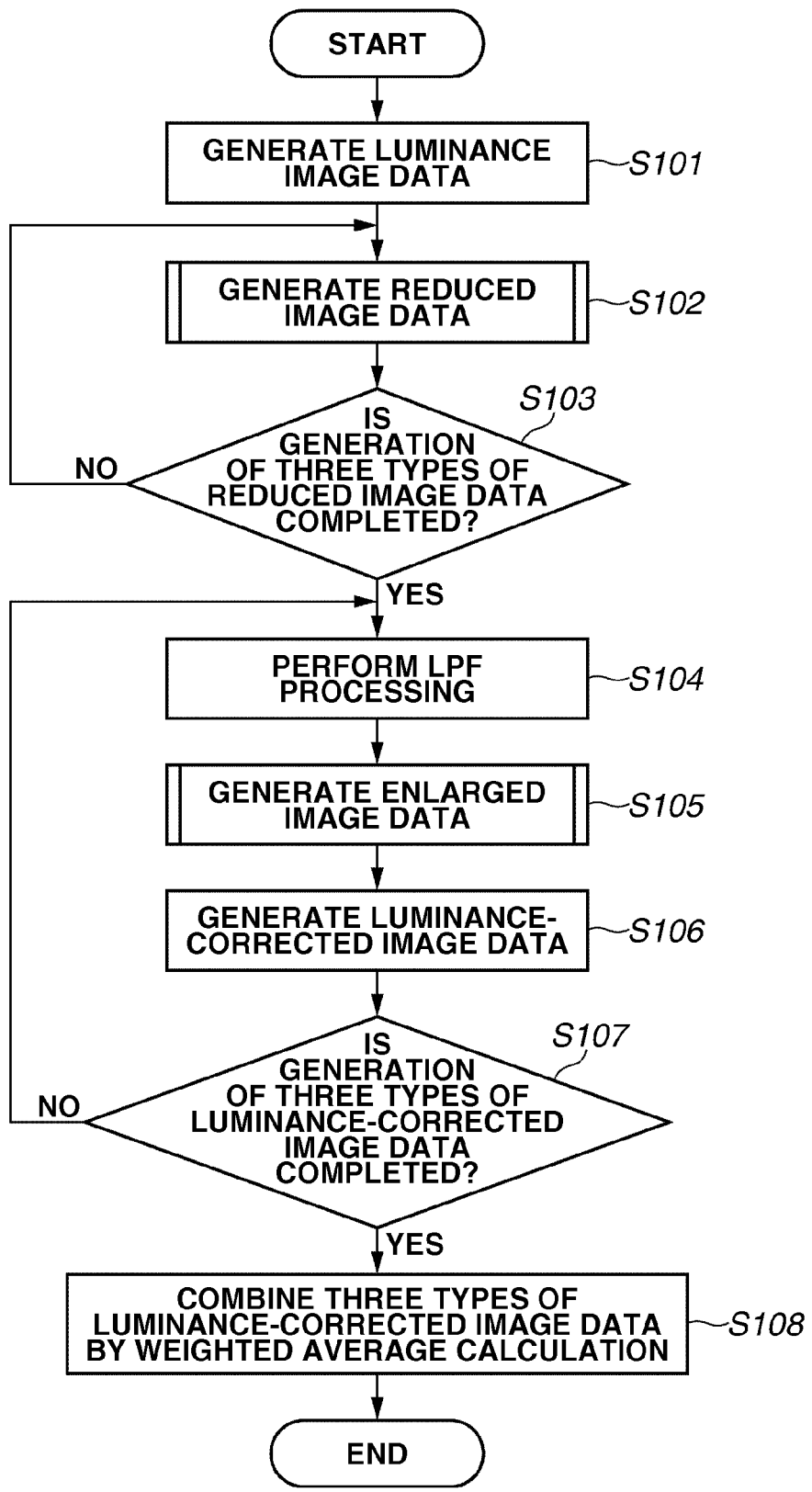

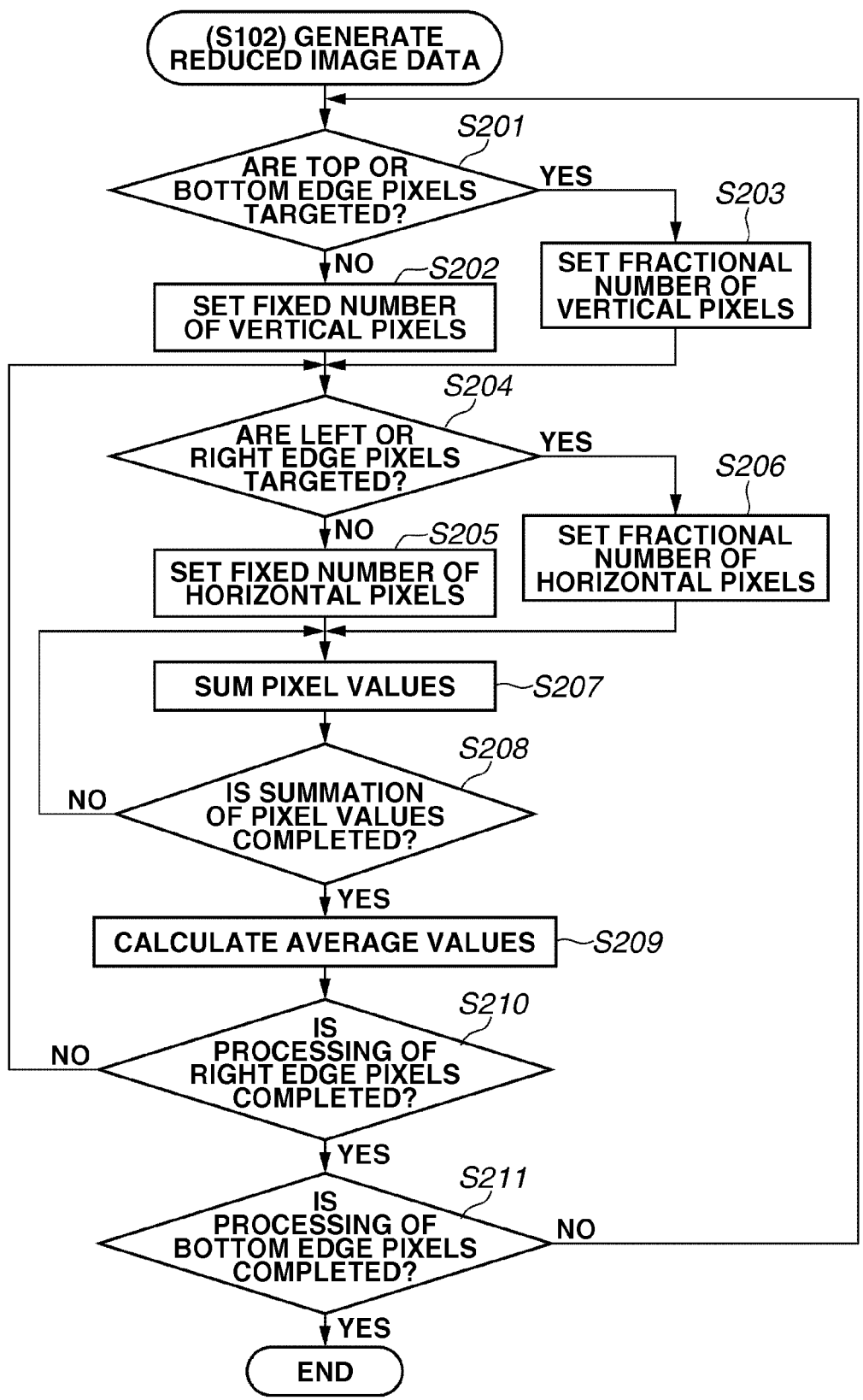

IMAGE CORRECTION APPARATUS FOR DIGITAL DODGING

BACKGROUND OF THE INVENTION

1. Field of the Invention

The present invention relates to an image correction apparatus and method that corrects an input image.

2. Description of the Related Art

In recent years, a camera having a wide dynamic range, i.e., a so-called wide dynamic range camera, capable of clearly photographing both a very bright object and a dark object existing at the same time in the same angle of view is attracting attention.

To enable photographing with such a wide dynamic range, a dodging process can be performed in a dark room for silver-halide photography. There is available a technique (hereinafter, referred to as "digital dodging") which achieves the dodging process by digital image processing to correct an object having a brightness difference, particularly, a backlit object. A conventional art relating to the digital dodging process is discussed in, for example, U.S. Patent Application Publication No. US 2006/0045377. In U.S. Patent Application Publication No. US 2006/0045377, as an area determination image for determining coefficients for performing a correction, an image is generated, from which a luminance component is extracted, and which is reduced and subsequently filtered through a low-pass filter, and enlarged up to the original size.

In the conventional art described above, if fractions of pixels appear in edges of an image during the reduction processing, there is a problem that the deviation of pixel position may become large in enlargement processing when the pixel data of fraction portions is discarded.

SUMMARY OF THE INVENTION

The present invention is directed to an image correction apparatus capable of obtaining a good image through simple processing.

According to an aspect of the present invention, an image correction apparatus for correcting an input image according to luminance includes a reduction unit configured to reduce the input image, for each area, at a reduction ratio corresponding to the area, to generate a reduced luminance image, an extraction unit configured to extract a low-frequency component image from the reduced luminance image, an enlargement unit configured to enlarge the extracted low-frequency component image, for each area, at an enlargement ratio corresponding to the area, to generate correction data according to a size of the input image, and a correction unit configured to correct the input image according to the correction data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a block diagram illustrating an example of an internal configuration of a 40× horizontal enlargement unit illustrated in FIG. 4.

FIG. 7 illustrates an example of a configuration of a digital camera apparatus (image processing system) according to an exemplary embodiment of the present invention.

FIG. 8 is a flowchart illustrating an example of a processing procedure of an image processing method by a digital camera apparatus (image processing system) according to an exemplary embodiment of the present invention.

FIG. 9 is a flowchart illustrating an example of a detailed processing procedure of reduced image generation processing in step S102 of FIG. 8.

DETAILED DESCRIPTION OF THE EMBODIMENTS

Various exemplary embodiments, features, and aspects of the invention will be described in detail below with reference to the drawings.

Figure 1:
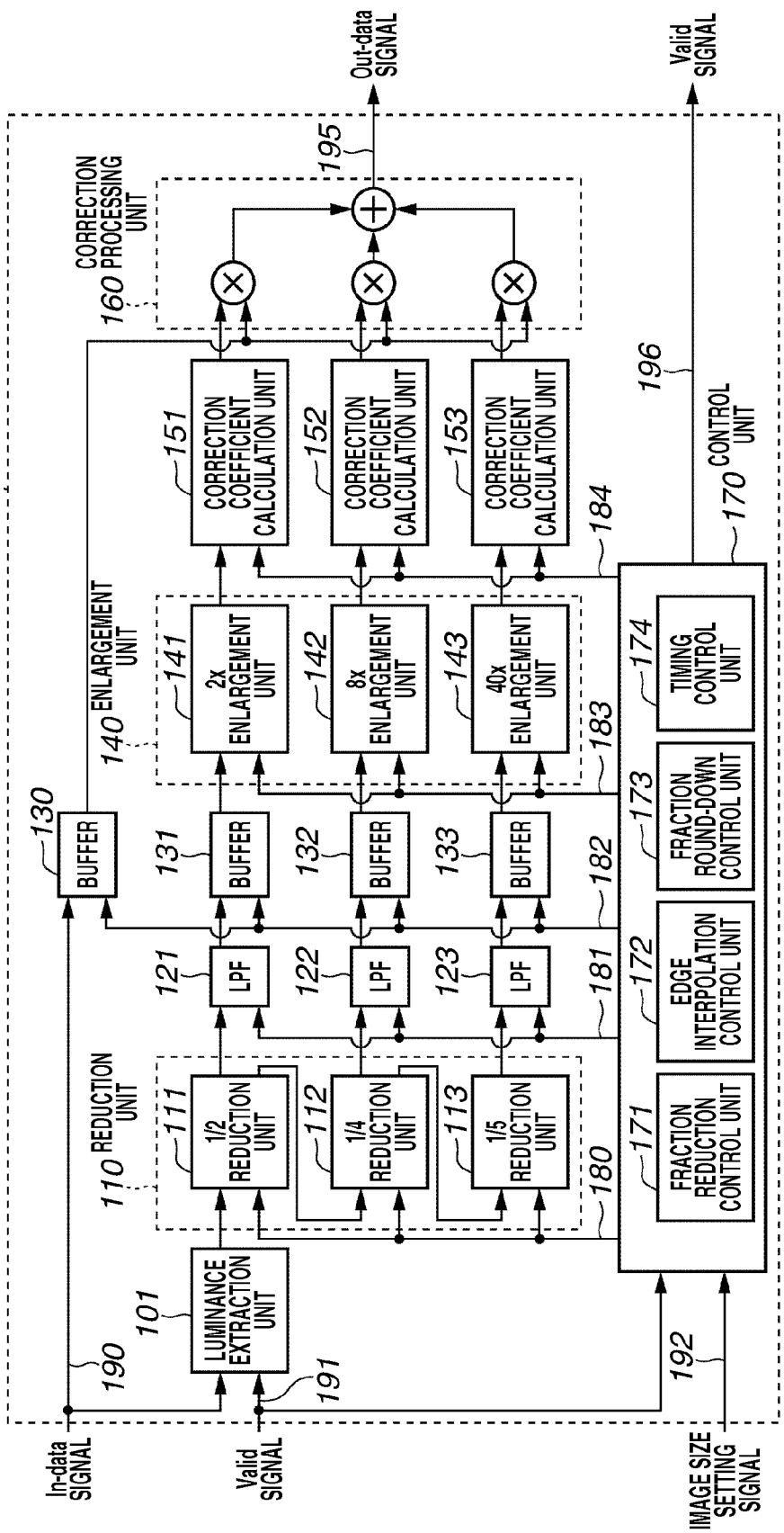
FIG. 1 illustrates an example of a configuration of an image processing apparatus according to an exemplary embodiment of the present invention.

FIG. 1 illustrates an example of a configuration of an image processing apparatus according to an exemplary embodiment of the present invention. FIG. 1 mainly illustrates a configuration of the image processing apparatus for performing a digital dodging process. As illustrated in FIG. 1, the image processing apparatus 100 includes a luminance extraction unit 101, a reduction unit 110, low-pass filters (LPFs) 121 to 123, buffers 130 to 133, an enlargement unit 140, correction coefficient calculation units 151 to 153, a correction processing unit 160, and a control unit 170.

Input signals to the image processing apparatus 100 include an input image data signal (In-data signal) 190, a valid input data signal (Valid signal) 191, and an image size setting signal 192. The input image data signal 190 is color image data made up of three types of data of RGB (red, green, and blue). The valid input data signal 191 is a signal representing timing when valid data is flowing in the input image data signal 190. The image size setting signal 192 is a signal for externally setting an image size for one screen on which the image processing apparatus 100 performs image processing.

Output signals from the image processing apparatus 100 include an output image data signal (Out-data signal) 195, and a valid output data signal (Valid signal) 196. The output image data signal 195 is color image data subjected to the image processing (after correction) by the image processing apparatus 100, made up of three types of data of RGB (red, green, and blue). The valid output data signal 196 is a signal representing timing when valid data is flowing in the output image data signal 195.

The luminance extraction unit 101 extracts a luminance component from input image data to generate luminance image data. More specifically, the luminance extraction unit 101 receives the input image data signal 190 at the timing when the valid input data signal 191 has become valid, and converts the input image data from RGB data to luminance data to generate luminance image data (original image data). The conversion methods for the luminance data include various methods such as a method by a conversion equation from RGB to YCbCr, a method by a conversion equation from RGB to HSV, and so forth, but are not necessarily limited thereto.

The reduction unit 110 performs reduction processing on the luminance image data generated by the luminance extraction unit 101, and performs processing to generate reduced image data. More specifically, in the present exemplary embodiment, the reduction unit 110 is configured to include a ½ reduction unit 111, a ¼ reduction unit 112, and a ⅕ reduction unit 113, which constitute a cascade-connected configuration. The luminance image data which has been input to the reduction unit 110, firstly, is converted to the reduced image data made up of ½ of the number of pixels by the ½ reduction unit 111, both vertically and horizontally, so that ½ reduced image data is generated. Then, the ½ reduced image data which has been generated by the ½ reduction unit 111 is output to the LPF 121 and also to the ¼ reduction unit 112.

In the ¼ reduction unit 112, the luminance image data is converted to the reduced image data of ¼ of the number of pixels, both vertically and horizontally. Accordingly, ⅛ reduced image data of the luminance image data (original image data) is generated. Then, the ⅛ reduced image data which has been generated by the ¼ reduction unit 112 is output to the LPF 122 and also to the ⅕ reduction unit 113. In the ⅕ reduction unit 113, the ⅛ reduced image data is converted to the reduced image data of ⅕ of the number of pixels, both vertically and horizontally. Accordingly, 1/40 reduced image data of the luminance image data (original image data) is generated.

The low-pass filters (LPFs) 121, 122, and 123 are connected to the ½ reduction unit 111, the ¼ reduction unit 112, and the ⅕ reduction unit 113, respectively. The LPFs 121, 122, and 123, are constituted by, for example, Gaussian filters and the like, and extract the low-frequency components of the reduced image data which have been generated by the reduction unit 110. In other words, the LPFs 121, 122, and 123 can perform processing to remove high-frequency components from the reduced image data. The low-pass filter processing is performed for blurring an image and generating an image indicating perspective brightness by eliminating the high-frequency components.

The buffers 131, 132, and 133 for timing adjustment are connected to the LPFs 121, 122, and 123, respectively. Further, they are connected such that the input image data signal 190 is input to the buffer 130 for timing adjustment.

The enlargement unit 140 performs enlargement processing to enlarge the reduced image from which the low-frequency components have been extracted by the LPFs (121, 122, and 123) up to the same resolution as that of the luminance image data (original image data), and performs processing to generate enlarged image data. More specifically, in the present exemplary embodiment, the enlargement unit 140 is configured to include a 2× enlargement unit 141, an 8× enlargement unit 142 and a 40× enlargement unit 143, which perform the enlargement processing on the reduced image data read out from the buffers 131, 132, and 133, respectively.

The ½ reduced image data which has been output from the ½ reduction unit 111 is subjected to the enlargement processing up to the image size of the original image data by the 2× enlargement unit 141 via the LPF 121 and the buffer 131. Further, the ⅛ reduced image data which has been output from the ¼ reduction unit 112 is subjected to the enlargement processing up to the image size of the original image data by the 8× enlargement unit 142 via the LPF 122 and the buffer 132. Similarly, the 1/40 reduced image data which has been output from the ⅕ reduction unit 113 is subjected to the enlargement processing up to the image size of the original image data by the 40× enlargement unit 143 via the LPF 123 and the buffer 133. Then, three types of the enlarged image data indicating perspective brightness, which are output from the 2× enlargement unit 141, the 8× enlargement unit 142, and the 40× enlargement unit 143, are output to the correction coefficient calculation units 151, 152, and 153, respectively.

The correction coefficient calculation units 151, 152 and 153 calculate and determine correction coefficients according to brightness of the enlarged image data which has been input. The darker portion with a low luminance takes the larger value of correction coefficient. The correction coefficients have been calculated in advance using a gamma function or the like, and have been previously stored as, for example, a look-up table. The correction coefficient calculation units 151, 152, and 153 calculate and determine respective correction coefficients using the look-up table.

The correction processing unit 160 corrects input image data using correction coefficients calculated by the correction coefficient calculation units 151, 152, and 153. More specifically, the correction processing unit 160 performs arithmetic processing of the input image data read out from the buffer 130 using correction coefficients output from the correction coefficient calculation units 151, 152, and 153, thereby correcting the input image data. In more detail, the correction processing unit 160 multiplies the input image data by three correction coefficients output from the correction coefficient calculation units 151, 152, and 153 and subsequently performs average arithmetic processing thereof. The correction processing unit 160 individually executes the processing with respect to each data of RGB to perform the correction processing of the input image data, and outputs the processed data as the output image data signal 195.

The control unit 170 counts the number of valid pixels according to the setting of the image size setting signal 192, based on the valid input data signal 191, and generates a control signal to conduct control of configuration units of the image processing apparatus 100. Control signal groups 180, 181, 182, 183, and 184 are output to control the reduction unit 110, LPFs 121 to 123, the buffers 130 to 133, the enlargement unit 140, and the correction coefficient calculation units 151 to 153, respectively. The control signal groups 180 to 184 are sent from the control unit 170 via a plurality of signal lines to the respective configuration units of the image processing apparatus 100 as described above. Further, the valid output data signal 196 is a signal indicating a time period during which the valid input data signal 191 output from the correction processing unit 160 is valid.

Further, the control unit 170 includes a fraction reduction control unit 171, an edge interpolation control unit 172, a fraction round-down control unit 173, and a timing control unit 174. The fraction reduction control unit 171 generates a control signal to instruct fraction processing of pixels during the reduction processing contained in the control signal group 180 to be sent to the reduction unit 110. The fraction processing control is performed to switch normal reduction processing by the reduction unit 110 to the fraction processing, when fractions of the pixels occur due to the relationship between the number of pixels of an image to be processed and a reduction ratio by the reduction unit 110.

The edge interpolation control unit 172 generates a control signal to instruct the interpolation processing of the pixels required during the enlargement processing of the image periphery. The control signal is contained in the control signal group 183 to be sent to the enlargement unit 140. The fraction round-down control unit 173 generates a control signal to instruct the round-down processing of the pixels required during the enlargement processing of the image periphery. The control signal is contained in the control signal group 183 to be sent to the enlargement unit 140. The timing control unit 174 generates timing control signals contained in the respective control signal groups 180 to 184, which are signals for adjusting operation timing of respective configuration units of the image processing apparatus 100. The timing control unit 174 also generates the valid output data signal 196.

Figure 6A:
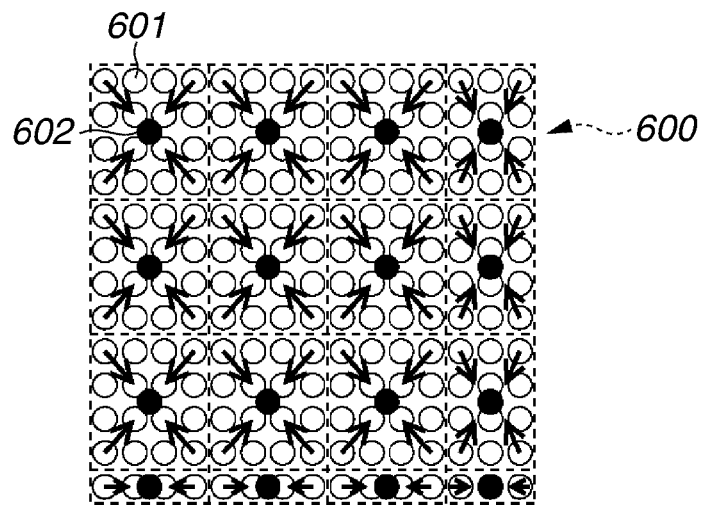
FIGS. 6A to 6C illustrate an example of reduction processing and enlargement processing of an image in the image processing apparatus according to an exemplary embodiment of the present invention.
Figure 6B:
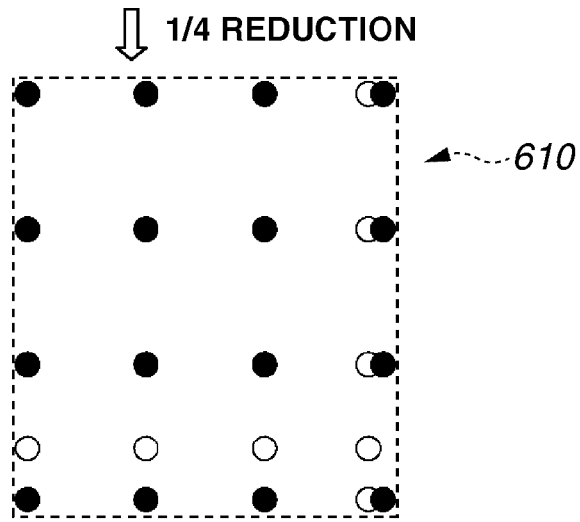
Figure 6C:
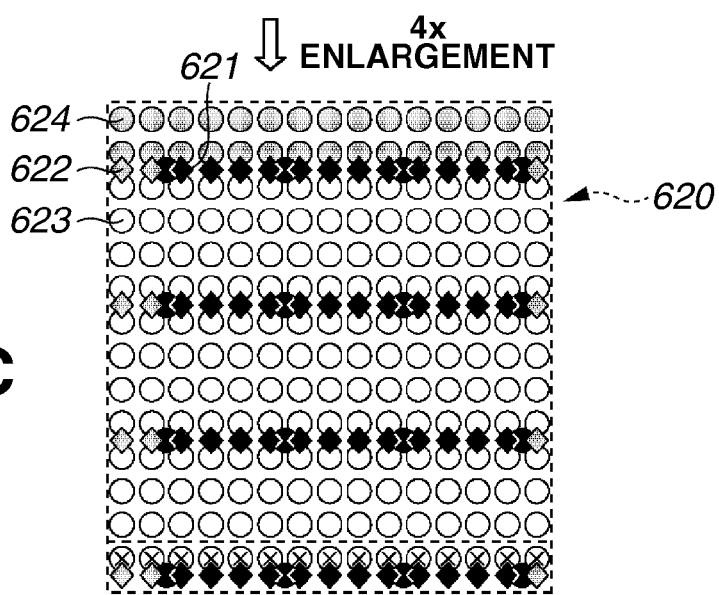

Next, before internal configurations in respective configuration units of the image processing apparatus 100 illustrated in FIG. 2 to FIG. 5 are described, a rough concept of image processing in the present exemplary embodiment will be described with reference to FIGS. 6A to 6C. FIGS. 6A to 6C illustrate an example of the reduction processing and the enlargement processing of the image performed in the image processing apparatus 100 according to the first exemplary embodiment of the present invention. In FIGS. 6A to 6C, to simplify the description, an example of reducing the image to ¼ of its size and subsequently enlarging the image up to 4 times is illustrated.

In FIG. 6A, a luminance image 600 before performing the reduction processing by the reduction unit is illustrated, where hollow circles 601 indicate pixels of the luminance image 600. More specifically, the luminance image 600 is made up of 15 horizontal pixels by 13 vertical pixels.

In ¼ reduction processing, first, an average for every four horizontal pixels is calculated in order from the top-left pixel of the luminance image 600, and next, an average for every four rows is calculated. Accordingly, an average of pixel data (pixel values) for 16 pixels portion of 4 vertical pixels×4 horizontal pixels is calculated, so that the reduction processing is effected. Solid black circles 602 in FIG. 6A each indicate center coordinates of the pixels which have been averaged.

In the processing of right edge areas (4 vertical pixels×3 horizontal pixels) of the luminance image 600, since 3 pixels are left as the fraction of the pixels, the reduction processing in the horizontal direction is effected by calculating an average of the 3 pixels. Further, in the processing of bottom edge areas (1 vertical pixel×4 horizontal pixels) of the luminance image 600, since one row is left as the fraction of the pixels in the vertical direction, calculation in the vertical direction is not performed, but an average only in the horizontal direction is calculated to perform the reduction processing. In this way, in the present exemplary embodiment, the reduction processing is performed of the fraction portions of pixels in edge areas of the luminance image 600 that do not meet the reduction ratio used for the reduction processing.

As the result of having performed the processing as described above, a reduced image 610 of 4 horizontal pixels by 4 vertical pixels illustrated in FIG. 6B is obtained from the luminance image (original image) 600 illustrated in FIG. 6A of 15 horizontal pixels by 13 vertical pixels. Right edge areas and bottom edge areas of the reduced image 610 will be hereinafter handled as the pixels at positions shown with solid black circles, for the purpose of simplification of the processing. However, they would be normally pixels at positions shown with hollow circles. In FIG. 6C, there is illustrated an enlarged image 620 subjected to 4 times enlargement processing by the enlargement unit after the reduced image 610 illustrated in FIG. 6B has been processed by the LPF. The solid black circles of the enlarged image 620 illustrated in FIG. 6C coincide with the solid black circles of the reduced image 610 illustrated in FIG. 6B.

Black rhombuses 621 and gray rhombuses 622 of the enlarged image 620 illustrated in FIG. 6C are pixel data generated by 4× horizontal enlargement processing. Pixel data of gray rhombuses 622 arranged at left and right edge areas of the enlarged image 620 illustrated in FIG. 6C is generated, for each area, by copying the adjacent pixel data at the left or right edge (pixel data of solid black circles at the left or right edge), since they are located outside the solid black circles. Further, pixel data of black rhombuses 621 each is calculated and generated by the linear interpolation from pixel data of two neighboring points of the solid black circles. In the example illustrated in FIG. 6C, distances from two neighboring points of the solid black circles are 1:7, 3:5, 5:3, and 7:1 in order. For example, pixel data located at a distance of 3:5 is obtained by adding ⅝× pixel data of the solid black circle at a distance of 3 to ⅜× pixel data of the solid black circle at a distance of 5.

Next, the pixel data of hollow circles 623 and gray circles 624 of the enlarged image 620 illustrated in FIG. 6C are pixel data generated by 4× vertical enlargement processing. The gray circles 624 arranged at the top or bottom edge area of the enlarged image 620 illustrated in FIG. 6C are located outside the pixel data of the rhombuses. Accordingly, they are generated by copying the pixel data of the rhombuses at the top or bottom edge. Further, the pixel data of the hollow circles 623 is calculated and generated by the linear interpolation from the pixel data rows of the top or bottom neighboring rhombuses. In this case, calculation of the linear interpolation is equivalent to 4× horizontal enlargement processing. Further, since pixel data marked with × (cross) symbols of the lowermost row of the hollow circles is pixel data located outside the image area of the luminance image (original image) 600 in FIG. 6A, rounding-down processing is performed.

In this way, in the present exemplary embodiment, the edge interpolation processing which supplements missing pixels in edge areas of the enlarged image 620 during the enlargement processing by the interpolation processing from neighboring pixels thereof is performed, and edge rounding-down processing which rounds down extra pixels of edge areas of the enlarged image 620 is performed.

The above-described processing in conformance with 4× enlargement after ¼ reduction as described in FIGS. 6A to 6C is also performed with respect to 2× enlargement after ½ reduction, 8× enlargement after ½ and ¼ reductions, 40× enlargement after ½, ¼, and ⅕ reductions in the image processing apparatus 100 illustrated in FIG. 1.

In the present exemplary embodiment, an aspect of performing the interpolation by copying the outermost neighboring pixel data is illustrated as a method for interpolating missing pixel data of edge areas (periphery) of the enlarged image during the enlargement processing. In the present invention, however, the present exemplary embodiment is not necessarily limited to the aspect by this copying. It is also possible to apply an aspect, for example, of performing so-called linear extrapolation (clipping if the maximum value or minimum value is exceeded), by extending an inclination of difference between the pixel data of the outermost neighboring pixels and the pixel data of one-inner row or column pixels thereof. Further, it is possible to apply an aspect of performing so-called folding interpolation, which calculates interpolation using a reverse inclination to the linear extrapolation.

Figure 2:
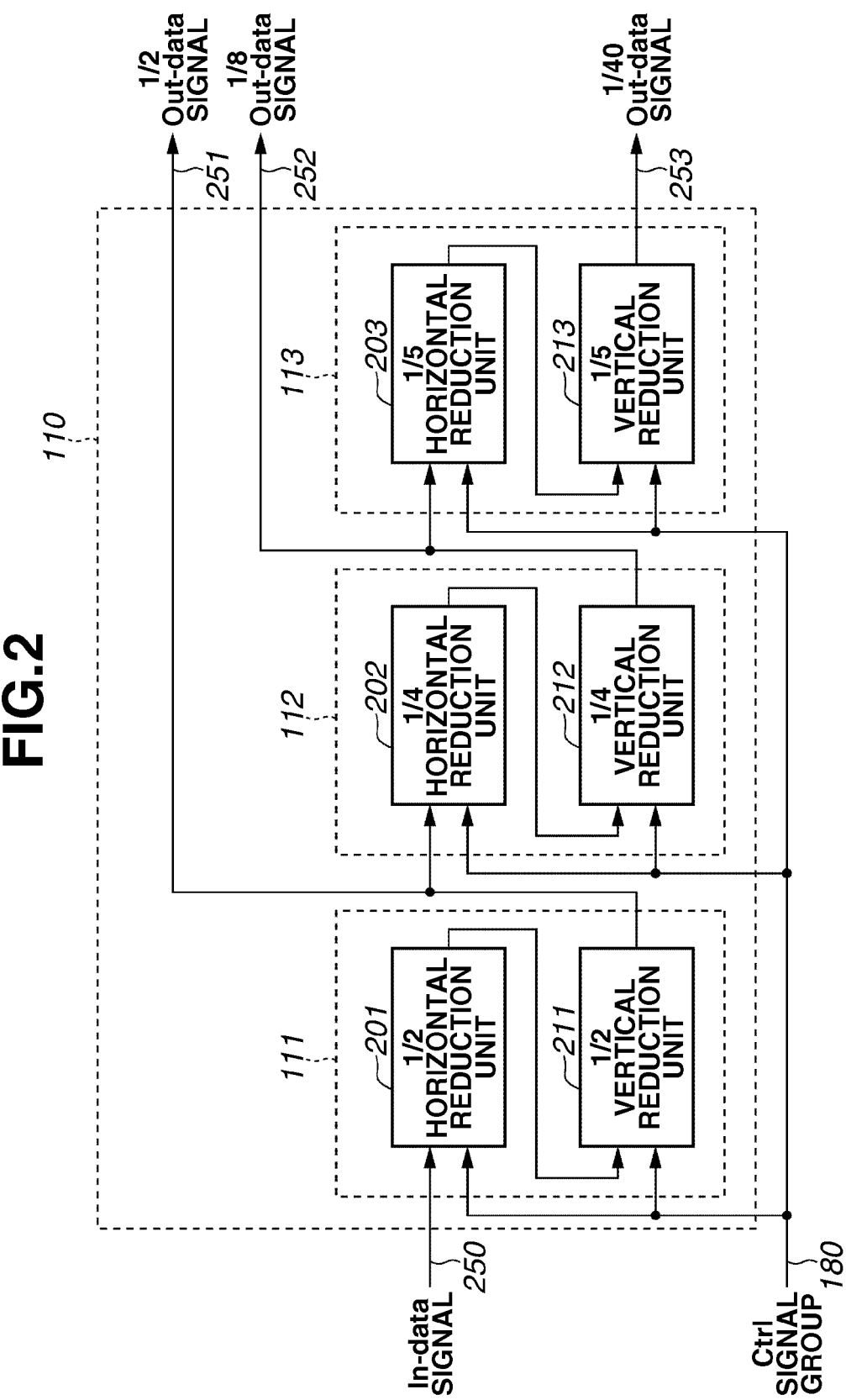
FIG. 2 is a block diagram illustrating an example of an internal configuration of a reduction unit illustrated in FIG. 1.

Next, the internal configurations of respective configuration units of the image processing apparatus 100 illustrated in FIG. 1 will be described with reference to FIG. 2 to FIG. 5. FIG. 2 is a block diagram illustrating an example of an internal configuration of the reduction unit 110 illustrated in FIG. 1. As illustrated in FIG. 2, a ½ reduction unit 111 is configured to include a ½ horizontal reduction unit 201 and a ½ vertical reduction unit 211. Further, a ¼ reduction unit 112 is configured to include a ¼ horizontal reduction unit 202 and a ¼ vertical reduction unit 212. Further, a ⅕ reduction unit 113 is configured to include a ⅕ horizontal reduction unit 203 and a ⅕ vertical reduction unit 213.

Input signals to the reduction unit 110 include an input image data signal (In-data signal) 250 and a control signal group (Ctrl signal group) 180. Further, output signals from the reduction unit 110 include a ½ reduced image data signal (½ Out-data signal) 251, a ⅛ reduced image data signal (⅛ Out-data signal) 252, and a 1/40 reduced image data signal (1/40 Out-data signal) 253. The control signal group 180 is generated by the control unit 170 to conduct control of the reduction unit 110. The input image data signal (In-data signal) 250 is a signal represented by the luminance image data output from the luminance extraction unit 101.

The input image data signal (In-data signal) 250 is processed and output as the ½ reduced image data signal 251 after the number of pixels in the horizontal direction has been subjected to the reduction processing to ½ in the ½ horizontal reduction unit 201 and, then, the number of pixels in the vertical direction has been subjected to reduction processing to ½ in the ½ vertical reduction unit 211. The ½ reduced image data signal 251 is output from the ½ vertical reduction unit 211 to the LPF 121 and also to the ¼ horizontal reduction unit 202.

Subsequently, the ½ reduced image data signal 251 is processed and output as the ⅛ reduced image data signal 252 after the number of pixels in the horizontal direction has been subjected to the reduction processing to ¼ in the ¼ horizontal reduction unit 202 and, then, the number of pixels in the vertical direction has been subjected to the reduction processing to ¼ in the ¼ vertical reduction unit 212. The ⅛ reduced image data signal 252 is output from the ¼ vertical reduction unit 212 to the LPF 122 and also to the ⅕ horizontal reduction unit 203.

Subsequently, the ⅛ reduced image data signal 252 is processed and output as the 1/40 reduced image data signal 253 after the number of pixels in the horizontal direction has been subjected to the reduction processing to ⅕ in the ⅕ horizontal reduction unit 203 and, then, the number of pixels in the vertical direction has been subjected to the reduction processing to ⅕ in the ⅕ vertical reduction unit 213. The 1/40 reduced image data signal 253 is output from the ⅕ vertical reduction unit 213 to the LPF 123. In this way, the luminance image data which has been input are reduced to ½, ⅛, and 1/40 in the vertical and horizontal directions. As a result, three types of reduced image data are generated by the reduction unit 110.

Figure 3:
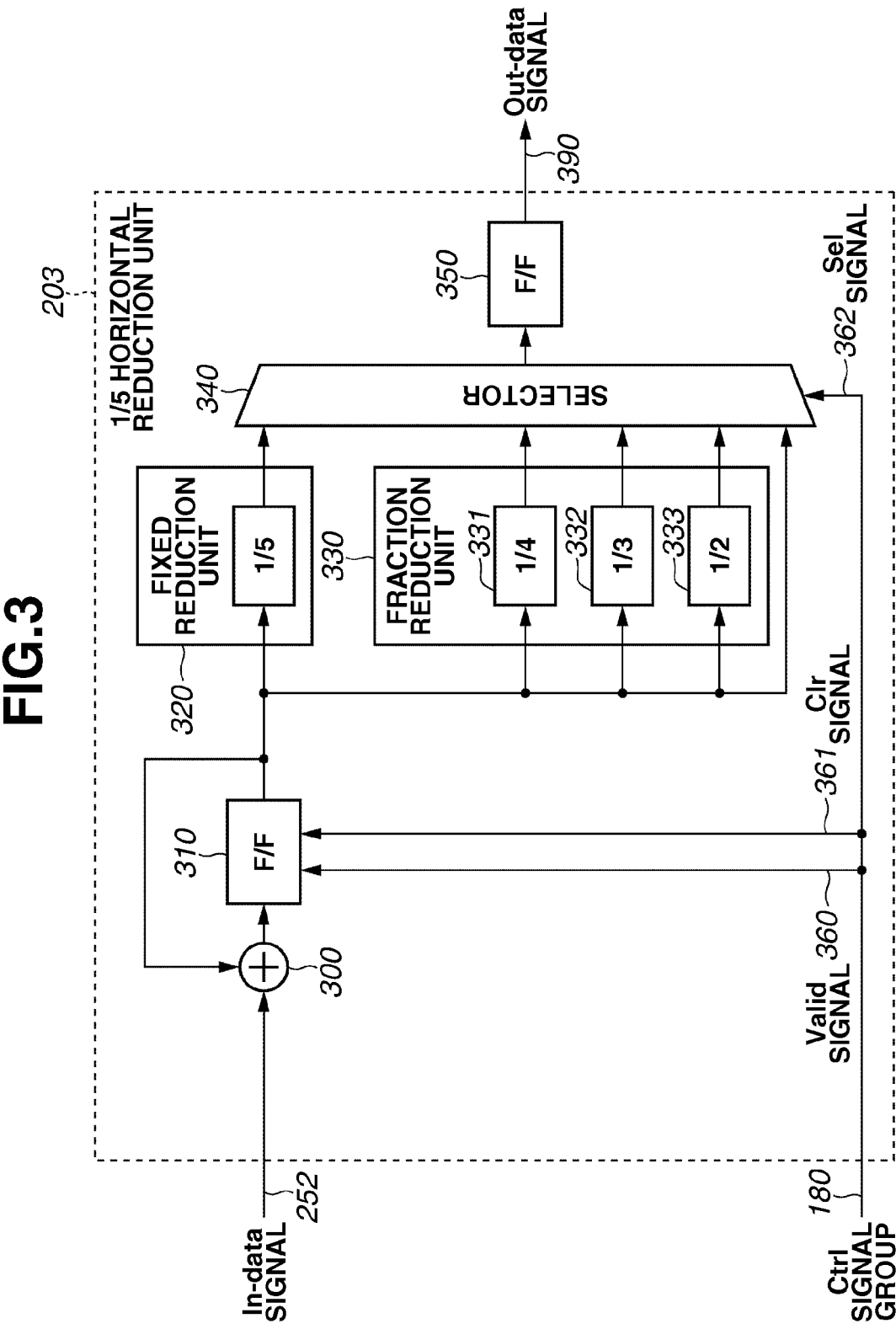
FIG. 3 is a block diagram illustrating an example of an internal configuration of a ⅕ horizontal reduction unit illustrated in FIG. 2.

FIG. 3 is a block diagram illustrating an example of an internal configuration of the ⅕ horizontal reduction unit 203 illustrated in FIG. 2. As illustrated in FIG. 3, the ⅕ horizontal reduction unit 203 is configured to include an adder 300, a flip-flop (F/F) 310, a fixed reduction unit 320, a fraction reduction unit 330, a selector 340, and a flip-flop (F/F) 350. Further, the fraction reduction unit 330 is configured to include a ¼ computing element 331, a ⅓ computing element 332, and a ½ computing element 333.

Input signals to the ⅕ horizontal reduction unit 203 include an input image data signal (In-data signal) 252 and a control signal group (Ctrl signal group) 180. Further, output signals from the ⅕ horizontal reduction unit 203 include an output image data signal (Out-data signal) 390. The output image data signal 390 corresponds to an input to the ⅕ vertical reduction unit 213.

The input image data signal 252 corresponds to the ⅛ reduced image data signal 252 output from the ¼ vertical reduction unit 212. The control signal group 180, which is generated by the control unit 170, includes a valid input data signal (Valid signal) 360, a summation clear signal (Clr signal) 361, and a fraction reduction processing selection signal (Sel signal) 362.

The input image data signal 252 is subjected to summation processing by the adder 300 and the flip-flop (F/F) 310. The summation processing is controlled by the valid input data signal 360 and the summation clear signal 361. The valid input data signal 360 is asserted for one clock period at a time period during which the image data of the input image data signal 252 is valid. In synchronization with the assertion of the valid input data signal 360, the flip-flop (F/F) 310 latches the results obtained by adding the output signal of its own to the input image data signal 252 using the adder 300. A summation result for 5 pixels is latched by the flip-flop (F/F) 310 in response to the valid input data signal 360 being asserted five times. Then, after the summation result for 5 pixels has been latched, the summation clear signal 361 is asserted for one clock period during the interval until the valid input data signal 360 is asserted, so that the summation result by the flip-flop (F/F) 310 is cleared.

The output of the flip-flop (F/F) 310 is connected to the fixed reduction unit 320 and the fraction reduction unit 330. The fixed reduction unit 320 outputs the value obtained by multiplying the output value of the flip-flop (F/F) 310 by ⅕, since the reduction unit is the ⅕ horizontal reduction unit 203. Further, the fraction reduction unit 330 outputs values obtained by multiplying the output value of the flip-flop (F/F) 310 by ¼ using the ¼ computing element 331, by ⅓ using the ⅓ computing element 332, and by ½ using the ½ computing element 333. More specifically, the fraction reduction unit 330 performs the reduction processing of fraction portions of pixels in edge areas of the image that do not meet the reduction ratio used for the designated reduction processing (processing to reduction to ⅕, in the present example).

Output signals from the fixed reduction unit 320, output signals from three computing elements of the fraction reduction unit 330, and output signals from the flip-flop (F/F) 310 are input to the selector 340. The selector 340 outputs signals selected by the fractional reduction processing selection signal 362 from among the above-described five signals which have been input. The signals selected by the selector 340 are latched by the flip-flop (F/F) 350. The fractional reduction processing selection signal 362 is a control signal generated by the fractional reduction control unit 171 of the control unit 170. The fractional reduction processing selection signal 362 is set to normally select the output signal of the fixed reduction unit 320. For example, during the reduction processing of the right edge area of the image, the fractional reduction processing selection signal 362 is set to switch the selection of output signals according to fractions of pixels.

The ⅕ horizontal reduction unit 203 has been described above with reference to FIG. 3. The internal configuration of the ⅕ vertical reduction unit 213 is almost similar to that of the ⅕ horizontal reduction unit 203 except that the flip-flops (F/Fs) 310 and 350 serve as line buffers, and accordingly the block diagram thereof will be omitted. Further, the ½ horizontal reduction unit 201 and the ½ vertical reduction unit 211 of the ½ reduction unit 111 and the ¼ horizontal reduction unit 202 and the ¼ vertical reduction unit 212 of the ¼ reduction unit 112 have also an almost similar configuration except that the number of components of the fraction reduction unit 330 is decreased, and accordingly the configuration view thereof will be omitted.

Figure 4:
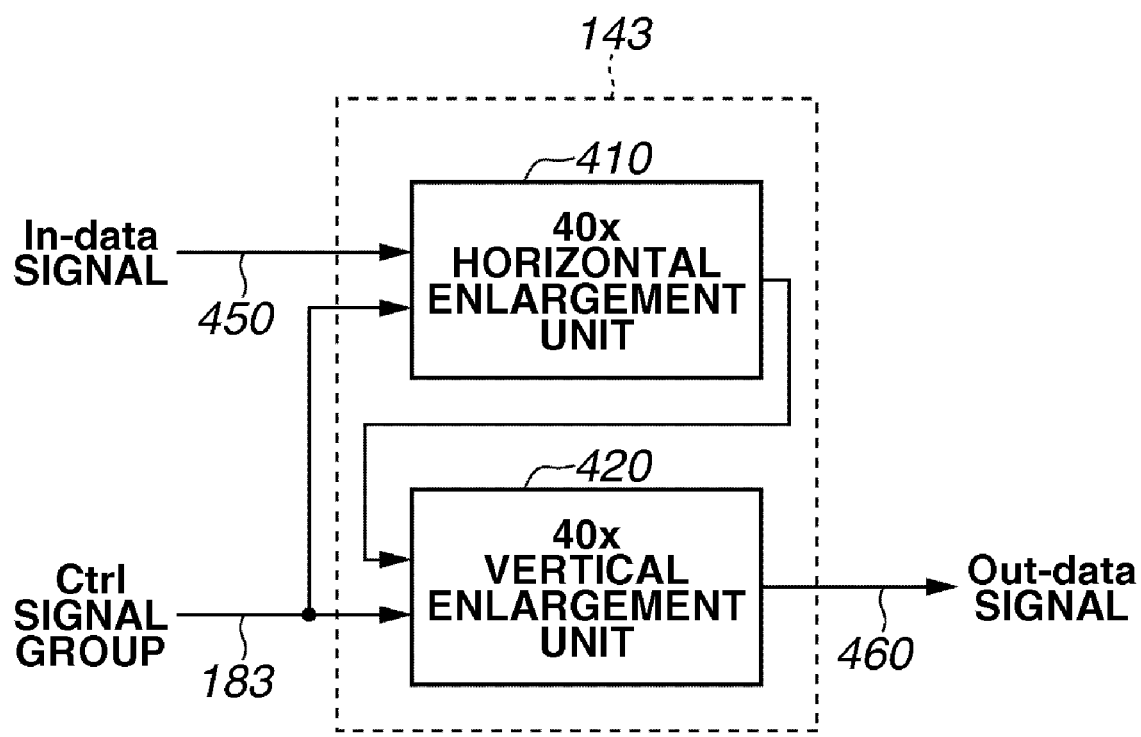
FIG. 4 is a block diagram illustrating an example of an internal configuration of a 40× enlargement unit illustrated in FIG. 1.

FIG. 4 is a block diagram illustrating an example of an internal configuration of the 40× enlargement unit 143 illustrated in FIG. 1. As illustrated in FIG. 4, the 40× enlargement unit 143 is configured to include a 40× horizontal enlargement unit 410 and a 40× vertical enlargement unit 420. Input signals to the 40× enlargement unit 143 include an input image data signal (In-data signal) 450 and a control signal group (Ctrl signal group) 183. Further, output signals from the 40× enlargement unit 143 include an output image data signal (Out-data signal) 460.

The control signal group 183 is generated by the control unit 170 to conduct control of the 40× enlargement unit 143. The input image data signal 450 is a signal representing the ¹⁄₄₀ reduced image data read from the buffer 133. The input image data signal 450 is enlarged such that the number of pixels in the horizontal direction is increased to 40 times by the 40× horizontal enlargement unit 410 and, then, the number of pixels in the vertical direction is increased to 40 times by the 40× vertical enlargement unit 420. As a consequence, 40× enlarged image data is generated, which is output as the output image data signal 460 to the correction coefficient calculation unit 153.

FIG. 5 is a block diagram illustrating an example of an internal configuration of the 40× horizontal enlargement unit 410 illustrated in FIG. 4. As illustrated in FIG. 5, the 40× horizontal enlargement unit 410 is configured to include flip-flops (F/Fs) 500 and 510, a linear interpolation unit 520, a selector 530, and a flip-flop (F/F) 540.

Input signals to the 40× horizontal enlargement unit 410 include an input image data signal (In-data signal) 450 and a control signal group (Ctrl signal group) 183. Further, output signals from the 40× horizontal enlargement unit 410 include an output image data signal (Out-data signal) 550. The output image data signal is input to the 40× vertical enlargement unit 420.

The control signal group 183, which is generated by the control unit 170, includes a valid input data signal (Valid signal) 560, a linear interpolation instruction signal (Enable signal) 561, and an edge interpolation processing selection signal (Sel signal) 562. The input image data signal 450 is latched by the flip-flop (F/F) 500 each time when the valid input data signal 560 is asserted for one clock period. The flip-flop (F/F) 510 is connected to the flip-flop (F/F) 500 and holds preceding data relative to data held by the flip-flop (F/F) 500.

The linear interpolation unit 520 receives outputs of the flip-flops (F/Fs) 500 and 510 and then outputs, in sequence in synchronization with a clock, 40 pieces of data obtained by a linear interpolation between the two pieces of data. The linear interpolation is performed at ratios of 1:79, 3:77, 5:75, . . . , 79:1 in this order. The linear interpolation instruction signal 561 continues to be asserted while 40 pieces of data are being output in sequence. After the linear interpolation instruction signal 561 has been deasserted, the valid input data signal 560 is asserted for one clock period, and the next pixel data is latched by the flip-flops (F/Fs) 500 and 510. Further, an accumulative total of the number of horizontal pixels of the enlarged image data may reach the original number of pixels designated by the image size setting signal 192 during processing of the right edge area of the image. In such a case, the linear interpolation instruction signal 561 is deasserted even if the 40 pieces of data have not been output. The linear interpolation instruction signal 561 is deasserted when the original number of pixels has been reached before the d 40 pieces of data are output. The processing to deassert the linear interpolation instruction signal 561 is controlled by the fraction round-down control unit 173.

The selector 530 receives an output signal of the linear interpolation unit 520 and an output signal of the flip-flop (F/F) 500. The selector 530 outputs a signal selected by the edge interpolation processing selection signal 562 generated by the edge interpolation control unit 172. The output signal from the selector 530 is latched by the flip-flop (F/F) 540. The edge interpolation processing selection signal 562 is set to normally select an output signal of the linear interpolation unit 520. However, the edge interpolation processing selection signal 562 can be set to make a copy of the pixel data by selecting an output signal of the flip-flop (F/F) 500, when an interpolation of pixels is required during fraction processing of both edges of the image. In the present exemplary embodiment, an interpolation by copying of image data is performed as the above-described interpolation method. However, as stated during description of FIGS. 6A to 6C, a so-called linear extrapolation or a folding interpolation may be applied.

According to the first exemplary embodiment, when a digital dodging process is performed, high-quality images can be obtained with simple processing without causing a positional deviation of pixels. Further, high-quality images can be obtained even if fractions of pixels occur during the reduction processing.

Next, an image processing system including the image processing apparatus 100 will be described. In the description below, as an image processing system according to a second exemplary embodiment of the present invention, an example to which a digital camera apparatus is applied will be described. The digital camera apparatus according to the present exemplary embodiment, including the image processing apparatus 100 for performing the digital dodging process, can perform the reduction processing/enlargement processing when generating an area determination image. In such as case, the digital camera apparatus performs processing to bring the centers of images before and after the processing as close as possible to each other, so that processing errors at the top or bottom or right or left become even.

FIG. 7 illustrates an example of a configuration of the digital camera apparatus (image processing system) according to the second exemplary embodiment of the present invention. As illustrated in FIG. 7, the digital camera apparatus 10 is configured to include a CPU 11, a ROM 12, a RAM 13, an image storage unit 14, an image input unit 15, a display unit 16, and a system bus 17. Further, in the ROM 12, a control program 12a is stored, and in RAM 13, an input image buffer 13a, a dodging buffer 13b, and a compressed image buffer 13c are provided.

In the present exemplary embodiment, respective configuration units (101, 110, 121 to 123, 140, 151 to 153, 160, and 170) of the image processing apparatus 100 illustrated in FIG. 1 are configured from the control program 12a stored in the CPU 11 and the ROM 12. More specifically, the CPU 11 executes the control program 12a, so that the functions of respective configuration units except the buffers 130 to 133 of the image processing apparatus 100 for performing the digital dodging process and the like are achieved. The processes of the luminance extraction unit 101, the reduction unit 110, the enlargement unit 140, the correction coefficient calculation units 151 to 153, the correction processing unit 160, and the control unit 170 are implemented by software. Further, in the present exemplary embodiment, the buffers 130 to 133 of the image processing apparatus 100 illustrated in FIG. 1 are configured in the RAM 13.

Figure 10:
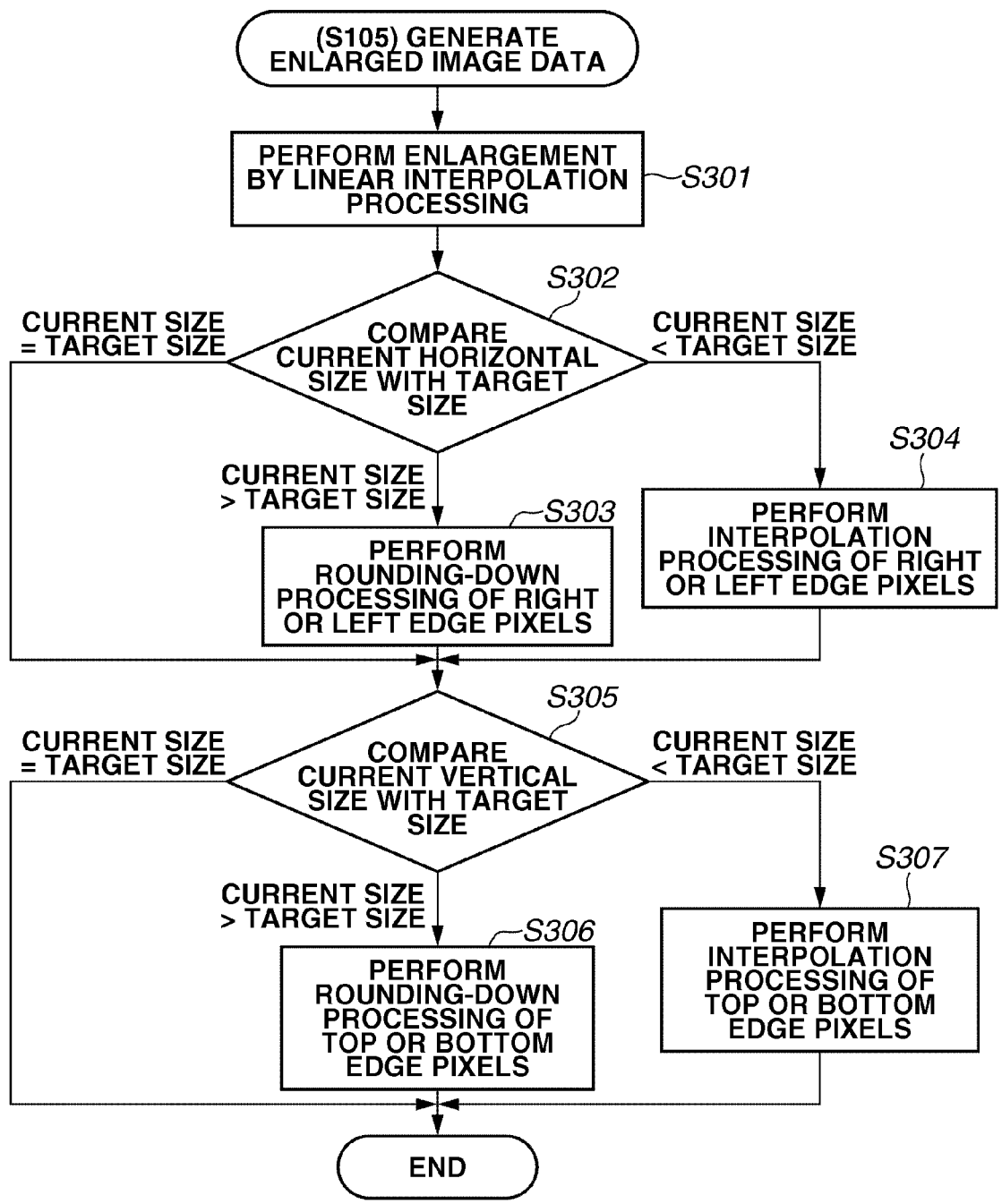
FIG. 10 is a flowchart illustrating an example of a detailed processing procedure of enlarged image generation process in step S105 of FIG. 8.

The central processing unit (CPU) 11 is configured to conduct control of the entire digital camera apparatus 10. The read-only memory (ROM) 12 is a memory for storing the control program 12*a* and parameters, which the CPU 11 uses when executing the control. In the ROM 12, for example, there are stored the control program 12*a* and parameters and the like for implementing the digital dodging process and image compression processing as illustrated in FIG. 8 to FIG. 10, as will be described below. The random access memory (RAM) 13 is a memory for temporarily storing various pieces of data and various pieces of information. In the present exemplary embodiment, in the RAM 13, as described above, the input image buffer 13*a*, the dodging buffer 13*b*, and the compressed image buffer 13*c* are configured.

In the input image buffer 13*a*, digital image data (In-data signal) 190 captured by the image input unit 15 is stored. In the dodging buffer 13*b*, there are stored intermediate processing data (data stored in the buffers 131 to 133) for performing the digital dodging process on image data stored in the input image buffer 13*a* and image data (Out-data signal) 195 of the processing result. The compressed image buffer 13*c* is used as storage area for intermediate processing data for performing compression processing with respect to the input image data (In-data signal) 190 stored in the input image buffer 13*a* or image data (Out-data signal) 195 obtained as the result of the dodging process stored in the dodging buffer 13*b*. Then, image data after the compression processing is stored in the image storage unit 14 under the control of the CPU 11.

The image input unit 15 is configured to capture, for example, an optical image of an object as digital image data. The display unit 16 displays, in real time, images based on input image data stored in the input image buffer 13*a*, as a finder image, during still image shooting or image data obtained as the result of the dodging process stored in the dodging buffer 13*b*. Further, images based on image data that have been subjected to compression processing stored in the image storage unit 14 are decompressed. The display unit 16 displays the decompressed images to enable observing photographed images.

The system bus 17 is a bus for establishing connection between the CPU 11 and other configuration units (12, 13, 14, 15, 16) to be communicated with each other. The CPU 11 exchanges various pieces of data and information, commands via the system bus 17 with other configuration units as described above.

Next, an image processing method by the digital camera apparatus 10 illustrated in FIG. 7 will be described. FIG. 8 is a flowchart illustrating an example of processing procedure of the image processing method by the digital camera apparatus 10 (image processing system) according to the present exemplary embodiment. More specifically, in FIG. 8, an overall flow of the digital dodging process is illustrated as the image processing method.

First, in step S101, the CPU 11 (the luminance extraction unit 101 as illustrating in FIG. 1) extracts a luminance component of input image data stored in the input image buffer 13*a* to generate luminance image data (original image data). More specifically, in step S101, the CPU 11 converts the input image data from RGB data to luminance data to generate the luminance image data. A conversion method for the luminance data includes various methods such as a method through the use of a conversion equation from RGB to YcbCr, a method through the use of a conversion equation from RGB to HSV, but it is not intended to be limited thereto, and it is only necessary to determine the luminance data by either one conversion method.

Subsequently, in step S102, the CPU 11 (the reduction unit 110 illustrated in FIG. 1) reduces the luminance image data generated by the luminance extraction unit 101 to generate reduced image data. More specifically, in step S102, in the case of the reduction unit 110 illustrated in FIG. 1, the ½ reduction unit 111, the ¼ reduction unit 112, and the ⅕ reduction unit 113 convert the luminance image data into reduced image data of three types of resolutions. The reduced image data of three types of resolutions is generated in order by using image data of a first resolution as input image data for image data of a second resolution generated, and using image data of the second resolution as input image data for image data of a third resolution. The detailed processing in step S102 will be described below with reference to FIG. 9.

Subsequently, in step S103, the CPU 11 (the reduction unit 110 or the control unit 170 illustrated in FIG. 1) determines whether generation of reduced image data of three types of resolutions is completed. If generation of reduced image data of three types of resolutions is not completed (NO in step S103), the process returns to step S102, in which generation processing of reduced image data of resolution of which generation is not completed is performed. On the other hand, if generation of the reduced image data of three types of resolutions is completed as the result of determination in step S103 (YES in step S103), the process proceeds to step S104. In the processes in steps S104 and later, processing will be performed for each reduced image data of three types of resolutions generated in step S102.

When the process proceeds to step S104, the CPU 11 (the LPFs 121 to 123 illustrated in FIG. 1) performs a low-pass filtering process on one reduced image data out of the reduced image data of three types of resolutions generated in step S102. In step S104, the reduced image data is subjected to the low-pass filtering process using, for example, a Gaussian filter, and processing to read out a low-frequency component of the reduced image data generated in step S102 (in other words, processing to remove a high-frequency component from the reduced image data) is performed. The low-pass filtering process is performed for blurring an image by removing a high-frequency component to generate an image with a perspective brightness/darkness.

Subsequently, in step S105, the CPU 11 (the enlargement unit 140 illustrated in FIG. 1) performs enlargement processing to enlarge the reduced image data, which has been subjected to the low-pass filter processing in step S104, up to the same resolution as that of the luminance image data (original image data), to generate enlarged image data. Detailed processing of step S105 will be described below with reference to FIG. 10.

Subsequently, in step S106, the CPU 11 (the correction coefficient calculation units 151 to 153 and the correction processing unit 160 illustrated in FIG. 1) performs the luminance correction processing of input image data consisting of RGB data, based on the enlarged image data generated in step S105. As a consequence, the luminance-corrected image data is generated. The luminance correction processing is performed, first, by calculating and determining the correction coefficients according to the luminance data (luminance values) of the enlarged image data, and then multiplying each of the RGB data of the input image data by the correction coefficients. The correction coefficients have been calculated in advance using a Gamma function or the like, and tabulated. The coefficient has the larger value for the darker portion with the lower luminance. This table is stored in, e.g., the ROM 12.

Subsequently, in step S107, the CPU 11 (the correction processing unit 160 or the control unit 170 illustrated in FIG. 1) determines whether generation of three types of luminance-corrected image data based on the reduced image data of three types of resolutions generated in step S102 is completed. If generation of three types of the luminance-corrected image data is not completed (NO in step S107), the process returns to step S104.

On the other hand, as the result of determination of step S107, if generation of three types of the luminance-corrected image data is completed (YES in step S107), the process proceeds to step S108. When the process proceeds to step S108, the CPU 11 (the correction processing unit 160 illustrated in FIG. 1) performs combination processing to combine three types of the luminance-corrected image data by weighted average calculation, and outputs final luminance-corrected image data. Then, processing of the flowchart illustrated in FIG. 8 ends.

Next, detailed processing in step S102 of FIG. 8 will be described. FIG. 9 is a flowchart illustrating an example of the detailed processing procedure of reduced image generation processing in step S102 of FIG. 8. Hereinbelow, in the processing in the flowchart illustrated in FIG. 9, the case where the processing is performed from top-left pixels of image data to be processed, in order such as, firstly in the horizontal direction, next in the vertical direction, will be described. In this case, presume that the image size of the luminance image data (original image data) is W horizontal pixels×H vertical pixels, and the reduction ratio is 1/N.

In steps S201 to S206 illustrated below, processing to determine the number of pixels in the vertical and horizontal directions of the original image data corresponding to the pixels to be output is performed. First, in step S201, the CPU 11 (the reduction unit 110 illustrated in FIG. 1) determines whether target pixels to be processed are pixels at the top or bottom edge area. As the result of determination of step S201, if target pixels to be processed are not pixels at the top or bottom edge areas (NO in step S201), the process proceeds to step S202. When the process proceeds to step S202, the CPU 11 (the reduction unit 110 illustrated in FIG. 1) sets the fixed number of vertical pixels to N. If the reduction ratio is ½, the fixed number of vertical pixels is 2. If the reduction ratio is ¼, the fixed number of vertical pixels is 4. In the reduced image generation processing of step S102, first, a ½ reducing operation on the luminance image data (the original image data), next, a ¼ reducing operation on ½ reduced luminance image data, and finally, a ⅕ reducing operation on ¼ reduced luminance image data are performed.

On the other hand, as the result of determination of step S201, if the target pixels to be processed are pixels at the top or bottom edge areas (YES in step S201), the process proceeds to step S203. When the process proceeds to step S203, the CPU 11 (the reduction unit 110 illustrated in FIG. 1) calculates and sets the fractional number of vertical pixels. More specifically, if target pixels to be processed are pixels at the top or bottom edge areas, a calculation equation for the fractional number of vertical pixels is given as follows:

$$\text{ROUND}((\text{MOD}(H,N)+N)/2)$$

where H is the number of vertical pixels of the original image to be reduced. If the reduction ratio is ½, N=2. If the reduction ratio is ¼, N=4. MOD(X, Y) denotes a calculation when X is divided by Y, and ROUND (X) denotes a calculation to round off all digits after decimal point of X, to round down the pixels at the top edge area, and to round up the pixels at the bottom edge area. By the calculation, the fractional number of pixels at the top or bottom edge areas becomes substantially even (when the number is aliquant, one row is increased for the bottom edge).

When the process of step S202 is completed or the process of step S203 is completed, the process proceeds to step S204. When the process proceeds to step S204, the CPU 11 (the reduction unit 110 illustrated in FIG. 1) determines whether target pixels to be processed are pixels at the right or left edge areas. As the result of determination of step S204, if the target pixel to be processed are not pixels at the left or right edge areas (NO in step S204), the process proceeds to step S205. When the process proceeds to step S205, the CPU 11 (the reduction unit 110 illustrated in FIG. 1) sets the fixed number of horizontal pixels to N.

On the other hand, as the result of determination in step S204, if target pixels to be processed are pixels at the left or right edge areas (YES in step S204), the process proceeds to step S206. When the process proceeds to step S206, the CPU 11 (the reduction unit 110 illustrated in FIG. 1) calculates and sets the fractional number of horizontal pixels. More specifically, if target pixels to be processed are pixels at the left or right edge areas, a calculation equation for the fractional number of horizontal pixels is given as follows:

$$\text{ROUND}((\text{MOD}(W,N)+N/2)$$

where, W is the number of horizontal pixels of the original image to be reduced. MOD (X, Y) denotes a remainder when X is divided by Y, and ROUND (X) denotes a calculation to round off all digits after decimal point of X, to round down pixels at the top edge areas, and to round up pixels at the bottom edge areas. By the calculation, the fractional number of pixels at the left or right edge areas becomes substantially even (when the number is aliquant, one pixel is increased for the right edge).

When the process of step S205 is completed or the process of step S206 is completed, the process proceeds to step S207. When the process proceeds to step S207, the CPU 11 (the reduction unit 110 illustrated in FIG. 1) performs summation calculation of image data (pixel values) of the pixels in the original image data which has been input from one to the end of the number of vertical pixels and the number of horizontal pixels which have been set in step S201 to step S206. Subsequently, in step S208, the CPU 11 (the reduction unit 110 illustrated in FIG. 1) determines whether the summation processing in step S207 is completed. If the summation processing in step S207 is not completed (NO in step S208), the process returns to step S207.

On the other hand, as the result of determination in step S208, if summation processing of step S207 is completed (YES in step S208), the process proceeds to step S209. When the process proceeds to step S209, the CPU 11 (the reduction unit 110 illustrated in FIG. 1) calculates average values by dividing summed values obtained by the summation processing of step S207 by the number of vertical pixels and the number of horizontal pixels which have been set in step S201 to step S206, and these values are defined as average pixel values. Subsequently, in step S210, the CPU 11 (the reduction unit 110 illustrated in FIG. 1) determines whether processing of right edge pixels are completed. If the processing of right edge pixels is not completed (NO in step S210), the process returns to step S204.

Reduced image data generation processing of step S102 is performed such that pixel values of an areas of the number of pixels which has been set in steps S202 and S205 are summed from the top-left edge pixels in step S207, and an average value of the summed pixel values is calculated in step S209. Next, an average value of pixel values of areas of the number of pixels which has been set in steps S202 and S205 to the right of areas of the number of pixels which has been set in step S202 and S205 at the top-left edge of the original image is calculated. In this way, areas where to calculate an average value are shifted towards the right. When the areas where to calculate an average value reach the right edge, an average value of pixel values of areas of the number of pixels which has been set in steps S202 and S206 are calculated.

Then, as the result of determination in step S210, if processing of the right edge pixels is completed (YES in step S210), the process proceeds to step S211. When the process proceeds to step S211, the CPU 11 (the reduction unit 110 illustrated in FIG. 1) determines whether processing of the bottom edge pixels is completed. If processing of the bottom edge pixels is not completed (NO in step S211), the process returns to step S201.

When processing of areas of the number of pixels which has been set in step S203 at the top edge of the original image is completed, average values are calculated for each number of pixels which has been set in step S205 or S206, with respect to areas of the number of pixels which has been set in step S202, below the areas where the processing is completed. In this way, areas where average values are to be calculated are shifted towards the bottom. When the areas where average values are to be calculated reach the bottom edge, average values are calculated for each number of pixels set in step S205 or S206, with respect to areas of the number of pixels set in step S203. Then, as the result of determination in step S211, if processing of the bottom edge pixels is completed (YES in step S211), processing in the flowchart illustrated in FIG. 9 ends.

In processes illustrated in FIG. 9, the CPU 11 sets fractions of pixels in the edge areas that do not meet the reduction ratio used for the reduction processing in steps S203 and S206, and then performs processes in steps S207 and S209, so that the CPU 11 can perform the reduction processing of the edge areas.

Next, detailed processing in step S105 of FIG. 8 will be described. FIG. 10 is a flowchart illustrating an example of the detailed processing procedure of the enlarged image generation processing in step S105 of FIG. 8. First, in step S301, the CPU 11 (the enlargement unit 140 illustrated in FIG. 1) performs the enlargement processing for enlarging the reduced image data after being subjected to a low-pass filtering process by the linear interpolation processing. In the linear interpolation processing in this case, presume that the enlargement ratio is N, the interpolation calculation is performed with respect to N pixels between two pixel points of the reduced image data with proportions of 1:2N−1, 3:2N−3, . . . , 2N−1:1. In this enlargement processing, for example, from two adjacent pixels in the horizontal direction, N-time enlargement processing in the horizontal direction for calculating pixel values of N pixels between the two pixels is repeated. Then, from two pixels adjoining in the vertical direction obtained by the processing, N-time enlargement processing in the vertical direction processing for calculating pixel values of N pixels between the two pixels is repeated, so that enlarged image data can be obtained.

Subsequently, in step S302, the CPU 11 (the enlargement unit 140 illustrated in FIG. 1) compares the horizontal size of the enlarged image data obtained by the linear interpolation processing in step S301 with the target horizontal size which is set based on, for example, the image size setting signal 192.

As the result of comparison in step S302, if the horizontal size of the enlarged image data obtained by the linear interpolation processing of step S301 is larger than the target horizontal size (current size>target size in step S302), the process proceeds to step S303. When the process proceeds to step S303, the CPU 11 (the enlargement unit 140 illustrated in FIG. 1) performs round-down processing of right or left pixels of the enlarged image data obtained by the linear interpolation processing in step S301 based on the target horizontal size, to make adjustment of the horizontal width. When the number of rounded-down pixels of right or left pixels is divisible by 2, rounding-down processing is performed evenly, and when not divisible by 2, right edge pixels with one column more are rounded down.

Further, as the result of comparison in step S302, if the horizontal size of the enlarged image data obtained by the linear interpolation processing in step S301 is smaller than the target horizontal size (current size<target size in step S302), the process proceeds to step S304. When the process proceeds to step S304, the CPU 11 (the enlargement unit 140 illustrated in FIG. 1) performs the interpolation processing of right or left pixels with respect to the enlarged image data obtained by the linear interpolation processing in step S301, based on the target horizontal size to conduct the adjustment of the horizontal width. If the number of right or left interpolated pixels is divisible by 2, the interpolation is performed evenly, whereas when not divisible by 2, left edge pixels with one column more are interpolated. Further, as interpolation methods, there are available techniques, for example, an interpolation by copying pixel data of left or right edge pixels, a linear extrapolation, and a folding interpolation to copy in line symmetry with respect to a boundary line of extreme (end) points.

If the processing in step S303 or step S304 is completed, or if it is determined that the horizontal size of the enlarged image data in step S302 coincides with the target horizontal size (current size=target size in step S302), the process proceeds to step S305. When the process proceeds to step S305, the CPU 11 (the enlargement unit 140 illustrated in FIG. 1) compares the vertical size of the enlarged image data obtained by the linear interpolation processing in step S301 with the target vertical size which is set based on, for example, the image size setting signal 192.

As the result of comparison in step S305, if the vertical size of the enlarged image data obtained by the linear interpolation processing in step S301 is larger than the target vertical size (current size>target size in step S305), the process proceeds to step S306. When the process proceeds to step S306, the CPU 11 (the enlargement unit 140 illustrated in FIG. 1) performs the rounding-down processing of top or bottom edge pixels of the enlarged image data obtained by the linear interpolation processing in step S301, based on the target vertical size to conduct the adjustment of the vertical width. If the number of rounded-down pixels of top or bottom edge pixels is divisible by 2, the rounding-down processing is performed evenly, and if not divisible by 2, bottom edge pixels with one row more are rounded down.

Further, as the result of comparison in step S305, if the vertical size of the enlarged image data obtained by the linear interpolation processing in step S301 is smaller than the target vertical size (current size<target size), the process proceeds to step S307. When the process proceeds to step S307, the CPU 11 (the enlargement unit 140 illustrated in FIG. 1) performs the interpolation processing of top or bottom edge pixels with respect to the enlarged image data obtained by the linear interpolation processing in step S301, based on the target vertical size to conduct the adjustment of the vertical width. If the number of interpolated top or bottom edge pixels is divisible by 2, the interpolation is performed evenly, and if not divisible by 2, top edge pixels with one row more are interpolated. Further, as interpolation methods, there are available techniques of, for example, an interpolation by copying the pixel data of top or bottom edge pixels, a linear extrapolation, and a folding interpolation by copying in line symmetry with respect to extreme points as a boundary line.

If the processing in step S306 or step S307 is completed, or if it is determined that the vertical size of the enlarged image data in step S305 coincides with target vertical size (current size=target size), the processing in the flowchart illustrated in FIG. 10 ends.

In the processing illustrated in FIG. 10, in steps S304 and S307, the interpolation processing is performed for supplementing missing pixels of edge areas of the enlarged image data during enlargement processing by the interpolation processing from neighboring pixels. Further, in steps S303 and S306, edge rounding-down processing is performed for rounding down extra pixels of edge areas of the enlarged image.

According to the second exemplary embodiment, high-quality images can be obtained with simple processing without causing positional deviations of pixels, when the digital dodging process is performed. Further, high-quality images can be obtained even if fractions of pixels occur during the reduction processing.

Respective configuration units (respective units) illustrated in FIG. 1 which constitute the image processing apparatus 100 according to exemplary embodiments of the present invention are described above, and respective steps illustrated in FIG. 8 to FIG. 10 can be implemented by a computer CPU (11) executing a program (12a) stored in a ROM (12). The program and a computer-readable storage medium storing the program are included in the present invention.

Further, exemplary embodiments of the present invention can be implemented with, for example, a system, an apparatus, a method, a program, or a storage medium. More specifically, the present invention can be applied to a system constituted by a plurality of apparatuses or can be applied to an apparatus constituted by single equipment.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-182962 filed Jul. 14, 2008, which is hereby incorporated by reference herein in its entirety.

What is claimed is:

1. An image correction apparatus for correcting an input image according to luminance, the image correction apparatus comprising:
a setting unit configured to set a first number, and to set a second number corresponding to a remainder when a number of pixels of the input image in a direction is divided by the first number;
a reduction unit configured to reduce the input image, for first areas corresponding to the first number of pixels, at a first reduction ratio corresponding to the first number, for second areas corresponding to the second number of pixels, at a second reduction ratio corresponding to the second number, to generate a reduced luminance image;
an extraction unit configured to extract a low-frequency component image from the reduced luminance image;
an enlargement unit configured to enlarge the extracted low-frequency component image, for each area, at an enlargement ratio corresponding to the area, to generate correction data according to a size of the input image; and
a correction unit configured to correct the input image according to the correction data.

2. The image correction apparatus according to claim 1, wherein the second number is smaller than the first number.

3. An image correction apparatus for correcting an input image according to luminance, the image correction apparatus comprising:
a reduction unit configured to perform first reduction processing at a first reduction ratio with respect to areas with a predetermined number of pixels located at other than edges, and second reduction processing at a second reduction ratio with respect to areas with the number of pixels smaller than the predetermined number of pixels located at edges to generate a reduced luminance image;
an extraction unit configured to extract a low-frequency component image from the reduced luminance image;
an enlargement unit configured to enlarge the extracted low-frequency component image, for each area, at an enlargement ratio corresponding to the area, to generate correction data according to a size of the input image; and
a correction unit configured to correct the input image according to the correction data.

4. The image correction apparatus according to claim 3, wherein the enlargement unit enlarges the extracted low-frequency component image, for each area, at an enlargement ratio corresponding to the area, to generate correction data according to a size and a resolution of the input image.

5. The image correction apparatus according to claim 1, wherein the enlargement unit performs interpolation processing with respect to a low-frequency component image smaller than a size according to the input image, and generation processing for generating a low-frequency component image corresponding to external areas of the low-frequency component image, to generate correction data according to a size of the input image.

6. The image correction apparatus according to claim 1, wherein the enlargement unit deletes areas that exceed a size of the input image from the low-frequency component image subjected to enlargement processing.

7. The image correction apparatus according to claim 1, wherein the reduction unit acquires a plurality of luminance images reduced at different reduction ratios,
wherein the enlargement unit generates correction data according to each of low-frequency component images of the plurality of luminance images reduced at different reduction ratios, and
wherein the correction unit corrects the input image according to the correction data generated according to each of low-frequency component images of the plurality of luminance images reduced at different reduction ratios, and combines input images corrected according to each correction data.

8. An image correction apparatus for correcting an input image according to luminance, the image correction comprising:
an averaging unit configured to average the input image, for each divided area, to generate an averaged luminance image;
an extraction unit configured to extract a low frequency component from the averaged luminance image;
a generation unit configured to perform interpolation processing with respect to a first low-frequency component image smaller than a size corresponding to the input image, and generation processing for generating a second low-frequency component image corresponding to an external area of the first low-frequency component image, to generate correction data according to a size of the input image; and a correction unit configured to correct the input image according to the correction data.

9. The image correction apparatus according to claim 8, wherein the averaging unit performs a first averaging process with respect to areas of a predetermined number of pixels, and a second averaging process with respect to areas with the number of pixels smaller than the predetermined number of pixels.

10. The image correction apparatus according to claim 8, wherein the averaging unit performs a first averaging process with respect to areas of a predetermined number of pixels located at other than edges, and a second reduced averaging process with respect to areas of the number of pixels smaller than the predetermined number of pixels located at edges.

11. The image correction apparatus according to claim 8, wherein the generation unit generates correction data according to a size and a resolution of the input image.

12. The image correction apparatus according to claim 8, wherein the averaging unit performs a plurality of averaging processes corresponding to different reduction ratios, wherein the generation unit generates correction data based on enlargement processing to enlarge each of a plurality of averaged luminance images corresponding to different reduction ratios at enlargement ratios corresponding to each of the reduction ratios, and wherein the correction unit corrects the input image according to the correction data generated based on the enlargement processing to enlarge each of the plurality of averaged luminance images at the enlargement ratios corresponding to the respective reduction ratios, and combines input images corrected according to each correction data.

13. A method for correcting an input image according to luminance, the method comprising:

setting a first number;

setting a second number corresponding to a remainder when a number of pixels of the input image in a direction is divided by the first number;

performing reduction processing of the input image, for first areas corresponding to the first number of pixels, at a first reduction ratio corresponding to the first number, for second areas corresponding to the second number of pixels, at a second reduction ratio corresponding to the second number, to generate a reduced luminance image;

extracting a low-frequency component image from the reduced luminance image;

performing enlargement processing of the extracted low-frequency component image, for each area, at an enlargement ratio corresponding to the area, to generate correction data according to a size of the input image; and correcting the input image according to the correction data.

14. The method according to claim 13, wherein the second number is smaller than the first number.

15. A method for correcting an input image according to luminance, the method comprising:

performing first reduction processing at a first reduction ratio with respect to areas of a predetermined number of pixels located at other than edges, and second reduction processing at a second reduction ratio with respect to areas of the number of pixels smaller than the predetermined number of pixels located at edges to generate a reduced luminance image;

extracting a low-frequency component image from the reduced luminance image;

performing enlargement processing of the extracted low-frequency component image, for each area, at an enlargement ratio corresponding to the area, to generate correction data according to a size of the input image; and correcting the input image according to the correction data.

16. The method according to claim 15, wherein the enlargement processing includes processing for enlarging the extracted low-frequency component image, for each area, at an enlargement ratio corresponding to the area, to generate correction data according to a size and a resolution of the input image.

17. The method according to claim 13, wherein the enlargement processing includes interpolation processing with respect to a low-frequency component image smaller than a size according to the input image, and generation processing for generating a low-frequency component image corresponding to external areas of the low-frequency component image, to generate correction data according to a size of the input image.

18. The method according to claim 13, wherein the generation processing includes processing for deleting areas exceeding a size of the input image from the second low-frequency component image.

19. A storage medium storing a computer program for correcting an input image according to luminance, the program comprising:

setting a first number;

setting a second number corresponding to a remainder when a number of pixels of the input image in a direction is divided by the first number;

performing reduction processing of the input image, for first areas corresponding to the first number of pixels, at a first reduction ratio corresponding to the first number, for second areas corresponding to the second number of pixels, at a second reduction ratio corresponding to the second number, to generate a reduced luminance image;

extracting a low-frequency component image from the reduced luminance image;

performing enlargement processing of the extracted low-frequency component image, for each area, at an enlargement ratio corresponding to the area, to generate correction data according to a size of the input image; and correcting the input image according to the correction data.

* * * * *